United States Patent
Jung et al.

(10) Patent No.: US 10,968,806 B2
(45) Date of Patent: Apr. 6, 2021

(54) METHOD AND SYSTEM OF UREA SOLUTION LEVEL MEASUREMENT ADJUSTMENT, DISPLAY AND HEATER OPERATION

(71) Applicants: Hyundai Motor Company, Seoul (KR); Kia Motors Corporation, Seoul (KR)

(72) Inventors: Jae Yoon Jung, Seongnam-si (KR); Oheun Kwon, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 54 days.

(21) Appl. No.: 16/382,405

(22) Filed: Apr. 12, 2019

(65) Prior Publication Data

US 2019/0234280 A1    Aug. 1, 2019

Related U.S. Application Data

(62) Division of application No. 15/362,667, filed on Nov. 28, 2016, now Pat. No. 10,302,001.

(30) Foreign Application Priority Data

Jul. 25, 2016    (KR) .................. 10-2016-0094294

(51) Int. Cl.
   *F01N 11/00*    (2006.01)
   *F01N 3/20*    (2006.01)
(52) U.S. Cl.
   CPC ............ *F01N 11/00* (2013.01); *F01N 3/2066* (2013.01); *F01N 11/002* (2013.01);
   (Continued)

(58) Field of Classification Search
   CPC combination set(s) only.
   See application file for complete search history.

(56) References Cited

U.S. PATENT DOCUMENTS

| 7,685,810 B2 * | 3/2010 | Hirata ..................... F01N 11/00 60/277 |
| 8,813,546 B2 * | 8/2014 | Takahashi ................ F01N 9/00 73/114.71 |

(Continued)

FOREIGN PATENT DOCUMENTS

| CN | 102906404 A | 1/2013 |
| CN | 104948279 A | 9/2015 |

(Continued)

*Primary Examiner* — Binh Q Tran
(74) *Attorney, Agent, or Firm* — Morgan, Lewis & Bockius LLP

(57) ABSTRACT

A method of adjusting and displaying urea solution level measurement value may include measuring urea solution concentration injected into a urea solution tank by a urea solution quality sensor, determining whether unclean urea solution is injected into the urea solution tank by the measured urea solution concentration, adjusting urea solution level value according to the urea solution concentration when the unclean urea solution is injected into the urea solution tank, comparing urea solution level measurement value with reference urea solution level measurement value, and lighting up a warning lamp when the urea solution level measurement value is lower than the reference urea solution level measurement value.

2 Claims, 4 Drawing Sheets

(52) U.S. Cl.
CPC .. *F01N 2610/02* (2013.01); *F01N 2610/1406* (2013.01); *F01N 2900/1811* (2013.01); *F01N 2900/1814* (2013.01); *F01N 2900/1818* (2013.01); *Y02T 10/12* (2013.01); *Y02T 10/40* (2013.01)

(56) References Cited

U.S. PATENT DOCUMENTS

| | | | |
|---|---|---|---|
| 9,664,083 | B2 | 5/2017 | Khaled |
| 10,082,067 | B2 * | 9/2018 | Yang ................ F01N 11/00 |
| 2007/0113625 | A1 | 5/2007 | Sasanuma |
| 2009/0193793 | A1 | 8/2009 | Matsunaga |
| 2010/0050606 | A1 | 3/2010 | Fulks |
| 2013/0064716 | A1 * | 3/2013 | Fukuoka ............. F01N 3/208 |
| | | | 422/106 |
| 2014/0331650 | A1 | 11/2014 | Yang |
| 2015/0096285 | A1 * | 4/2015 | Andrews ............. F01N 11/00 |
| | | | 60/286 |
| 2017/0044949 | A1 * | 2/2017 | Khaled ............. F01N 3/2896 |

FOREIGN PATENT DOCUMENTS

| | | |
|---|---|---|
| EP | 3073083 A1 | 9/2016 |
| JP | 2014-005697 A | 1/2014 |
| JP | 2014-134117 A | 7/2014 |
| JP | 2014-173469 A | 9/2014 |
| JP | 2015-143509 A | 8/2015 |
| JP | 2016-183563 A | 10/2016 |
| KR | 10-2010-0061160 A | 6/2010 |
| KR | 10-2013-0116282 A | 10/2013 |
| KR | 10-1437118 B1 | 9/2014 |
| KR | 10-2015-0139169 A | 12/2015 |

* cited by examiner

METHOD AND SYSTEM OF UREA SOLUTION LEVEL MEASUREMENT ADJUSTMENT, DISPLAY AND HEATER OPERATION

CROSS-REFERENCE TO RELATED APPLICATION

The present application is a Divisional of U.S. patent application Ser. No. 15/362,667, filed Nov. 28, 2016, which claims priority to Korean Patent Application No. 10-2016-0094294 filed on Jun. 25, 2016, the entire contents of which applications are incorporated herein for all purposes by these references.

BACKGROUND OF THE INVENTION

Field of the Invention

The present invention relates to a method and a system of adjusting, displaying of urea solution level measurement value and heater operation. More particularly, the present invention relates to a method and a system of adjusting, displaying of urea solution level measurement and heater operation by determining unclean urea solution injection through urea solution quality sensor.

Description of Related Art

Generally, an exhaust gas exhausted through an exhaust manifold from an engine is led to a catalytic converter formed on an exhaust pipe and is purified. After that, noise of the exhaust gas is reduced during passing through a muffler and is exhausted to the air through a tail pipe.

A selective catalytic reduction (SCR) converter is one type of such catalytic converters.

The SCR means that reducing agents such as urea, ammonia, carbon monoxide and hydrocarbon (HC) react better with nitrogen oxide than oxygen.

An exhaust system of a vehicle provided with the SCR converter includes a urea solution tank and a dosing module. The dosing module injects the reducing agents such as the urea into the exhaust gas passing through the exhaust pipe. Thereby, the SCR converter can reduce the nitrogen oxide efficiently.

However, purifying efficiency of the nitrogen oxide in the SCR converter is greatly affected by urea quality. That is, if the urea quality is not suitable, the SCR converter is hard to purify the nitrogen oxide. Therefore, regulations demand that means for warning unsuitable urea quality should be mounted at the vehicle.

Urea solution quality sensors are increasingly used for warning the unsuitable urea quality. Injection of unclean urea solution generates error of urea solution tank level recognition. The unclean urea solution is frozen quickly compared to normal urea solution to damage a urea solution injector and a pump.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method and a system of minimizing probability of damage of an injector and a pump by determining unclean urea solution by using a urea solution quality sensor, adjusting urea solution tank level mis-recognition, and setting heater operation condition according to the unclean urea solution concentration.

A method of adjusting and displaying urea solution level measurement value according to an exemplary embodiment of the present invention includes measuring urea solution concentration injected into a urea solution tank by a urea solution quality sensor, determining whether unclean urea solution is injected into the urea solution tank by the measured urea solution concentration, adjusting urea solution level value according to the urea solution concentration when the unclean urea solution is injected into the urea solution tank, comparing urea solution level measurement value with reference urea solution level measurement value, and lighting up a warning lamp when the urea solution level measurement value is lower than the reference urea solution level measurement value.

Meanwhile, a method of heater operation according to an exemplary embodiment of the present invention includes measuring urea solution concentration injected into a urea solution tank by a urea solution quality sensor, determining whether unclean urea solution is injected into the urea solution tank by the measured urea solution concentration, determining urea solution temperature is lower than heater operation condition temperature according to unclean urea solution when the unclean urea solution is injected into the urea solution tank, and operating the heater when the urea solution temperature is lower than the heater operation condition temperature according to the unclean urea solution concentration.

Meanwhile, the method of heater operation according to an exemplary embodiment of the present invention may further include determining whether the urea solution temperature is lower than sub-zero 7 degrees when the unclean urea solution is not injected into the urea solution tank, and operating the heater when the urea solution temperature is lower than sub-zero 7 degrees.

Meanwhile, the heater operation condition temperature according to the unclean urea solution concentration may be set by measuring a freezing point according to the unclean urea solution concentration.

Meanwhile, the heater operation condition temperature may be zero degree when the unclean urea solution concentration is 100%.

Meanwhile, the heater operation condition temperature may be fifty degrees when the unclean urea solution concentration is 50%.

A system of adjusting, displaying of urea solution level measurement value and heater operation according to an exemplary embodiment of the present invention includes a urea solution temperature sensor measuring urea solution temperature, a urea solution level sensor measuring urea solution level, a urea solution quality sensor measuring urea solution quality, and a controller connected with the urea solution temperature sensor, the urea solution level sensor and the urea solution quality sensor, and lighting up a warning lamp when the urea solution is insufficient, and applying a signal operating a heater according to the urea solution temperature.

The controller may measure urea solution concentration injected into a urea solution tank by the urea solution quality sensor and determine whether unclean urea solution is injected into the urea solution tank through the measured urea solution concentration.

The controller may adjust urea solution level measurement value according to the urea solution concentration when unclean urea solution is injected into the urea solution tank.

The controller may compare urea solution level measurement value with reference urea solution level measurement value and light up a warning lamp when the urea solution level measurement value is lower than the reference urea solution level measurement value The controller may determine the urea solution temperature is lower than a heater operation condition temperature according to the unclean urea solution concentration when the unclean urea solution is injected into the urea solution tank through the measured urea solution concentration, and apply a signal operating the heater when the urea solution temperature is lower than the heater operation condition temperature according to the unclean urea solution concentration.

The controller may determine whether the urea solution temperature is lower than sub-zero 7 degrees when it is determined that the unclean urea solution is not injected into the urea solution tank through the measured urea solution concentration, and apply a signal operating the heater when the urea solution temperature is lower than sub-zero 7 degrees According to the present invention, urea solution shortage warning lamp may be exactly lightened according to the status of unclean urea solution.

Further, heater efficiency may be improved by determining optimum heater operation condition according to unclean urea solution concentration, and probability of damage of the urea solution injector and the urea solution pump may be minimized.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
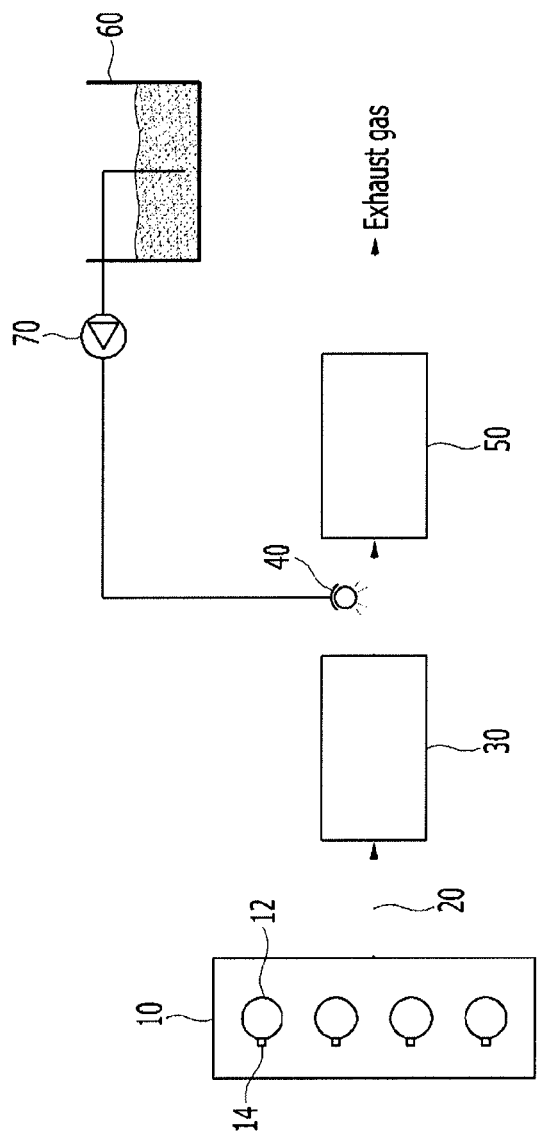
FIG. 1 is a schematic diagram of an exemplary exhaust system to which a system of adjusting, displaying of urea solution level measurement value and heater operation may be applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in exemplary embodiments, since like reference numerals designate like elements having a same configuration, various exemplary embodiments is representatively described, and in other exemplary embodiments, only configurations different from the various exemplary embodiments will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. In addition, same structures, elements, or components illustrated in two or more drawings use same reference numerals for showing similar features. It will be understood that when an element such as a layer, film, region, or substrate is referred to as being "on" another element, it can be directly on the other element or intervening elements may also be present.

The exemplary embodiment of the present invention shows an exemplary embodiment of the present invention in detail. As a result, various modifications of the drawings will be expected. Therefore, the exemplary embodiment is not limited to a specific aspect of the illustrated region, and for example, includes modifications of an aspect by manufacturing.

Now, an exhaust system to which a system of adjusting, displaying of urea solution level measurement value and heater operation may be applied according to an exemplary embodiment of the present invention will be described with reference to FIG. 1.

Referring to FIG. 1, an exhaust gas generated at an engine 10 passes sequentially through a particulate filter 30 and a selective catalytic reduction (SCR) converter 50. In this process, noxious materials contained in the exhaust gas can be removed. As circumstances demand, an oxidation catalyst instead of the particulate filter 30 may be used or the oxidation catalyst as well as the particulate filter 30 may be used. The particulate filter 30 and the SCR converter 50 are mounted on an exhaust pipe 20.

The engine 10 burns air-fuel mixture in which fuel and air are mixed to convert chemical energy into mechanical energy. The engine 10 is connected to an intake manifold to receive the air into a combustion chamber 12, and is connected to an exhaust manifold so as to discharge the exhaust gas generated at combustion process and gathered in the exhaust manifold to an exterior of the vehicle. An injector 14 is mounted in the combustion chamber 12 to inject the fuel into the combustion chamber.

The exhaust pipe 20 is connected to the exhaust manifold and the exhaust gas is exhausted to an exterior of the vehicle through the exhaust pipe 20.

The particulate filter 30 is mounted on the exhaust pipe 20 downstream of the engine 10 and traps soot contained in the exhaust gas.

The SCR converter 50 is mounted on the exhaust pipe 20 downstream of the particulate filter 30 and reduces nitrogen oxide contained in the exhaust gas into nitrogen gas using reducing agent.

For these purposes, the exhaust system further includes a urea solution tank 60, a urea solution pump 70 and a dosing device 40.

The urea solution tank 60 stores urea solution therein.

The urea solution pump 70 pumps the urea solution in the urea solution tank 60.

The dosing device 40 injects the urea solution pumped by the urea solution pump 70 into the exhaust pipe 20. The dosing device 40 is mounted on the exhaust pipe 20 between the particulate filter 30 and the SCR converter 50 and injects the urea solution to the exhaust gas that will flow into the SCR converter 50. The urea solution injected to the exhaust gas is decomposed into ammonia and the decomposed ammonia is used as the reducing agent for the nitrogen oxide.

Figure 2:
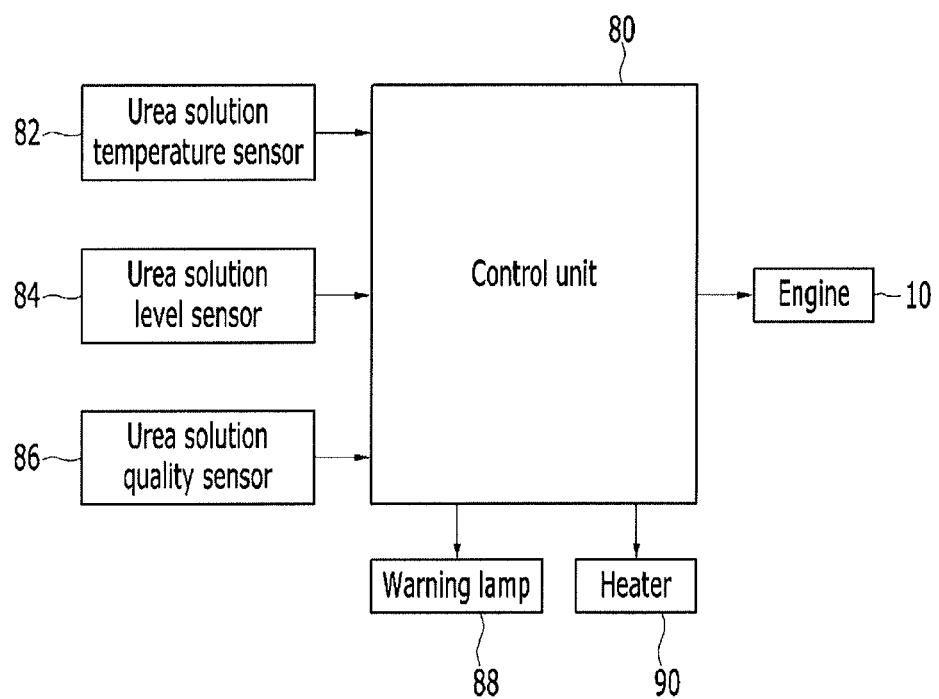
FIG. 2 is a block diagram of a system of adjusting, displaying of urea solution level measurement value and heater operation according to an exemplary embodiment of the present invention.

FIG. 2 is a block diagram of a system of adjusting, displaying of urea solution level measurement value and heater operation according to an exemplary embodiment of the present invention.

As shown in FIG. 2, a system of adjusting, displaying of urea solution level measurement value and heater operation according to an exemplary embodiment of the present invention includes a urea solution temperature sensor 82, a urea solution level sensor 84, a urea solution quality sensor 86, a controller 80, a warning lamp 88, a heater 90, and an engine 10.

The urea solution temperature sensor 82 is mounted at the urea solution tank 60, detects a temperature of the urea solution stored in the urea solution tank 60, and transmits a signal corresponding thereto to the controller 80.

The urea solution level sensor 84 is mounted at the urea solution tank 60 and detects a raw urea level in the urea solution tank 60 using ultrasonic wave. Generally, a level surface of the urea solution in the urea solution tank 60 changes continuously during the vehicle runs. In this specification, a raw urea level means the urea level detected at any moment and the urea level means an average of the raw urea level for any period. That is, the raw urea level is a value which changes continuously even though the urea is not supplied nor consumed, and the urea level is a value which does not change when the urea is not supplied nor consumed. The urea solution level sensor 84 may determine the urea level based on the raw urea level and may transmit a signal corresponding thereto to the controller 80. On the contrary, the urea solution level sensor 84 may transmit a signal corresponding to the raw urea level to the controller 80. At a latter case, the controller 80 may calculate the urea level based on the raw urea level. In this specification and claims, it is to be understood that the detecting urea level includes that the urea solution level sensor 84 detects the raw urea level and determines the urea level as well as that the urea solution level sensor 84 detects raw urea level and the controller 80 determines the urea level.

The urea solution quality sensor 86 detects a urea solution quality and transmits a signal corresponding thereto to the controller 80. Herein, the urea solution quality may be a urea solution concentration.

The controller 80 is connected with the urea solution temperature sensor 82, the urea solution level sensor 84 and the urea solution quality sensor 86, and lights up the warning lamp 88 when the urea solution is insufficient, and operates a heater according to the urea solution temperature.

The controller 80 measures urea solution concentration injected into a urea solution tank 60 by the urea solution quality sensor 86 and determines whether unclean urea solution is injected into the urea solution tank 60 through the measured urea solution concentration.

Further, controller 80 adjusts urea solution level measurement value according to the urea solution concentration when unclean urea solution is injected into the urea solution tank 60, and compares urea solution level measurement value with reference urea solution level measurement value and applies a signal lighting up a warning lamp 88 when the urea solution level measurement value is lower than the reference urea solution level measurement value.

Further, controller 80 determines the urea solution temperature is lower than a heater operation condition temperature according to the unclean urea solution concentration when the unclean urea solution is injected into the urea solution tank through the measured urea solution concentration, and applies a signal operating the heater 90 when the urea solution temperature is lower than the heater operation condition temperature according to the unclean urea solution concentration.

Further, controller 80 determines the urea solution temperature is lower than a heater operation condition temperature according to the unclean urea solution concentration when the unclean urea solution is injected into the urea solution tank 60 through the measured urea solution concentration, and applies a signal operating the heater 90 when the urea solution temperature is lower than the heater operation condition temperature according to the unclean urea solution concentration.

The controller 80 can be realized by at least one processor activated by predetermined program, and the predetermined program can be programmed to perform each step of a method of adjusting, displaying of urea solution level measurement value and heater operation according to an exemplary embodiment of the present invention.

Hereinafter, a method of adjusting, displaying of urea solution level measurement value and heater operation according to an exemplary embodiment of the present invention will be described in detail with reference to FIG. 3 and FIG. 4.

Figure 3:
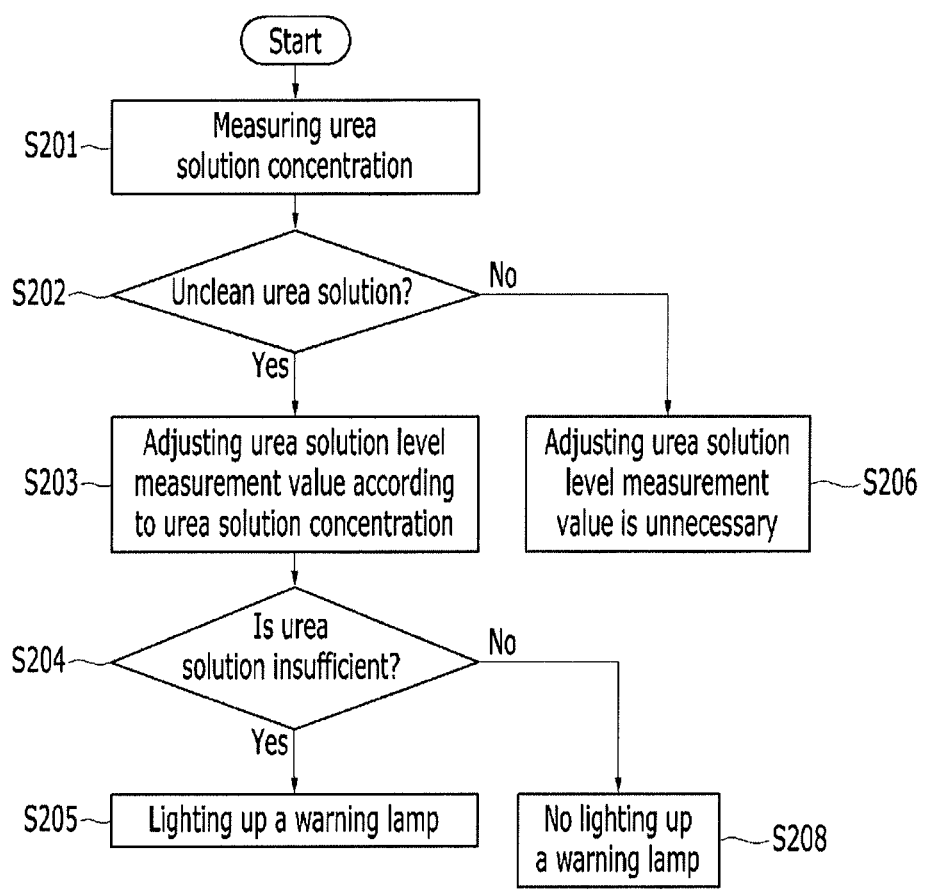
FIG. 3 is a flowchart of a method of adjusting and displaying of urea solution level measurement value according to an exemplary embodiment of the present invention.
Figure 4:
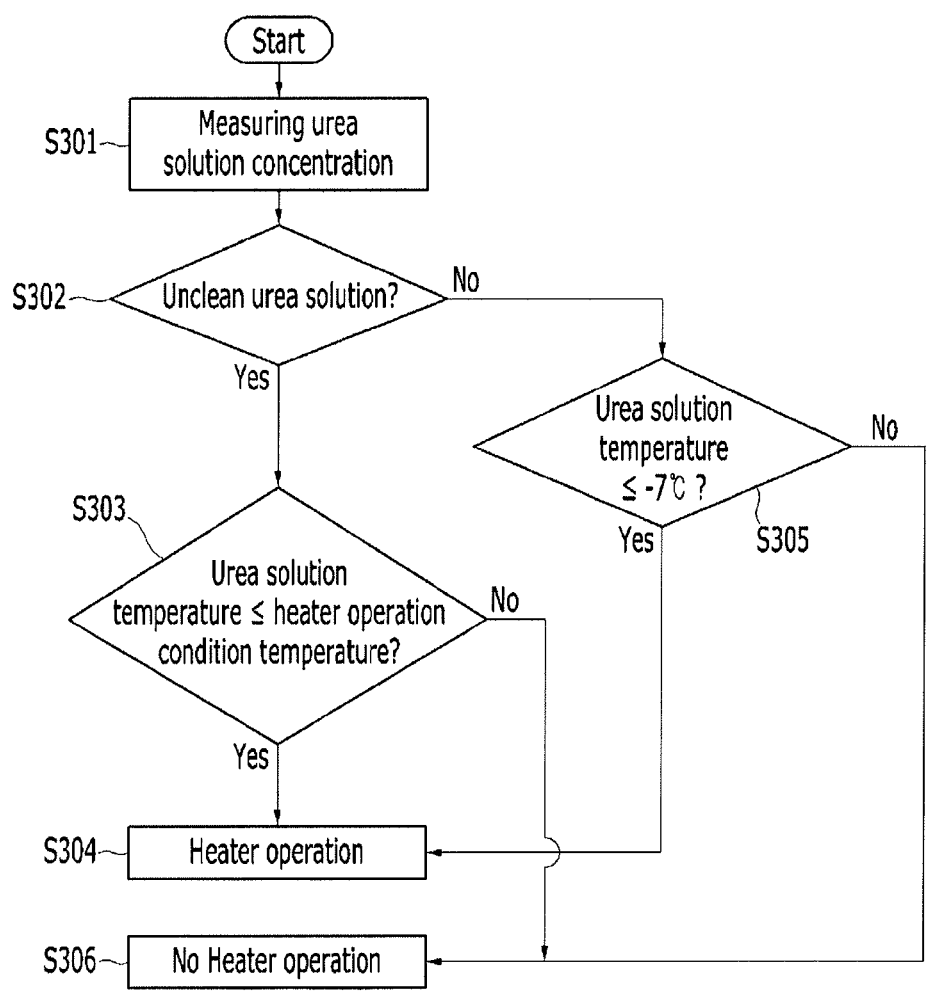
FIG. 4 is a flowchart of a method of heater operation according to an exemplary embodiment of the present invention.

FIG. 3 is a flowchart of a method of adjusting and displaying of urea solution level measurement value according to an exemplary embodiment of the present invention, and FIG. 4 is a flowchart of a method of heater operation according to an exemplary embodiment of the present invention.

As shown in FIG. 3, firstly, urea solution concentration injected into a urea solution tank by a urea solution quality sensor is measured S201. The urea solution quality sensor detects a urea solution quality and transmits a signal corresponding thereto to the controller. Herein, the urea solution quality may be a urea solution concentration.

Next, it is determined whether unclean urea solution is injected into the urea solution tank by the measured urea solution concentration S202. The unclean urea solution means the urea solution mixed with impurities, not pure urea solution.

Next, the urea solution level value is adjusted according to the urea solution concentration when it is determined that the unclean urea solution is injected into the urea solution tank 3. When the unclean urea solution is injected into the urea solution tank, level measurement value is higher than that of normal urea solution by approximately 10%. Urea solution measurement value may be adjusted by the controller as a level measurement value when a normal urea solution is used by using experimental data conducted in advance.

Next, urea solution level measurement value and reference urea solution level measurement value are compared S204, and a warning lamp is lit up when the urea solution level measurement value is lower than the reference urea solution level measurement value S205.

Referring to FIG. 4, firstly, urea solution concentration injected into a urea solution tank by a urea solution quality sensor is measured S301. Next, it is determined whether unclean urea solution is injected into the urea solution tank by the measured urea solution concentration S302.

It is determined urea solution temperature is lower than heater operation condition temperature according to unclean urea solution when the unclean urea solution is injected into the urea solution tank S303. At this time, the heater operation condition temperature according to the unclean urea solution concentration is set by measuring a freezing point according to the unclean urea solution concentration. The heater operation condition temperature may be zero degree when the unclean urea solution concentration is 100%, and the heater operation condition temperature may be fifty degrees when the unclean urea solution concentration is 50%.

Next, the heater operates when the urea solution temperature is lower than the heater operation condition temperature according to the unclean urea solution concentration S304.

It is determined whether the urea solution temperature is lower than sub-zero 7 degrees when the unclean urea solution is not injected into the urea solution tank S305, and the heater operates when the urea solution temperature is lower than sub-zero 7 degrees S304.

As described above, according to exemplary embodiments of the present invention, the heater durability may be improved and operation efficiency may be optimized by variable control of heater operation point of time by determining a freezing point of fluid in the urea solution tank according to the unclean urea solution concentration. Accordingly, probability of damage of the urea solution injector and the urea solution pump may be minimized.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of operation of a heater, comprising:
measuring urea solution concentration injected into a urea solution tank by a urea solution quality sensor;
determining whether unclean urea solution is injected into the urea solution tank, by the measured urea solution concentration;
determining whether urea solution temperature is lower than heater operation condition temperature according to the unclean urea solution when the unclean urea solution is injected into the urea solution tank;
operating the heater when the urea solution temperature is lower than the heater operation condition temperature according to the unclean urea solution concentration;
determining whether the urea solution temperature is lower than sub-zero 7 degrees when the unclean urea solution is not injected into the urea solution tank; and
operating the heater when the urea solution temperature is lower than sub-zero 7 degrees;
wherein the heater operation condition temperature is zero degree when the unclean urea solution concentration is 100%, and
wherein the heater operation condition temperature is fifty degrees when the unclean urea solution concentration is 50%.

2. The method of claim 1, wherein the heater operation condition temperature according to the unclean urea solution concentration is set by measuring a freezing point according to the unclean urea solution concentration.

* * * * *